(12) United States Patent
Kishigami et al.

(10) Patent No.: US 10,355,876 B2
(45) Date of Patent: Jul. 16, 2019

(54) COMMUNICATIONS DEVICE FOR TRANSMITTING A DIFFERENTIAL SIGNAL

(71) Applicant: DENSO CORPORATION, Kariya, Aichi-pref. (JP)

(72) Inventors: Tomohisa Kishigami, Kariya (JP); Shuichi Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 76 days.

(21) Appl. No.: 15/498,861

(22) Filed: Apr. 27, 2017

(65) Prior Publication Data

US 2018/0041358 A1 Feb. 8, 2018

(30) Foreign Application Priority Data

Aug. 5, 2016 (JP) .................................. 2016-154783

(51) Int. Cl.
| | |
|---|---|
| *H04B 1/40* | (2015.01) |
| *H04L 1/24* | (2006.01) |
| *H04L 12/26* | (2006.01) |
| *H04L 12/40* | (2006.01) |

(52) U.S. Cl.
CPC .............. *H04L 12/40* (2013.01); *H04B 1/40* (2013.01); *H04L 1/248* (2013.01); *H04L 12/40045* (2013.01); *H04L 43/0823* (2013.01); *H04L 2012/40215* (2013.01)

(58) Field of Classification Search
None
See application file for complete search history.

(56) References Cited

U.S. PATENT DOCUMENTS

| | | | | |
|---|---|---|---|---|
| 6,480,144 B1* | 11/2002 | Miller | ................... | B60R 21/013 180/167 |
| 6,640,174 B2* | 10/2003 | Schondorf | ............. | B60K 28/14 180/271 |
| 6,853,094 B2* | 2/2005 | Feddersen | ............. | F03D 7/0224 290/44 |
| 6,856,040 B2* | 2/2005 | Feddersen | ............. | F03D 7/0224 290/44 |
| 6,856,041 B2* | 2/2005 | Siebenthaler | ......... | F03D 7/0224 290/44 |
| 6,933,625 B2* | 8/2005 | Feddersen | ............. | F03D 7/0224 290/44 |
| 7,015,595 B2* | 3/2006 | Feddersen | ............. | F03D 7/0224 290/44 |
| 7,453,235 B2* | 11/2008 | Blair | ..................... | H02J 7/0022 320/116 |
| 7,888,969 B2* | 2/2011 | Metzner | ................ | H04L 25/028 326/31 |

(Continued)

FOREIGN PATENT DOCUMENTS

JP 2013-542690 A 11/2013

*Primary Examiner* — Gregory B Sefcheck
(74) *Attorney, Agent, or Firm* — Posz Law Group, PLC

(57) ABSTRACT

In a communication device, when an enabling signal is at a high level and a transmit data is at a high level, that is, in a recessive period, both transistors turn off. Thus, potentials of signal lines are determined by power supply from a second transmitting part to a communications network. When an error frame arises in this state, that is, transistors in the other ECU turn on, excessive currents flow the signal lines. When current monitoring circuits detect error currents, an error signal is changed to a high level.

11 Claims, 7 Drawing Sheets

(56) References Cited

U.S. PATENT DOCUMENTS

| | | | | |
|---|---|---|---|---|
| 8,513,950 | B2* | 8/2013 | Tanabe | H01M 10/48 |
| | | | | 324/426 |
| 8,781,809 | B2* | 7/2014 | Bridges | B60L 11/1842 |
| | | | | 703/18 |
| 9,330,045 | B2* | 5/2016 | Muth | G06F 13/4072 |
| 9,372,236 | B2* | 6/2016 | Lee | G01R 31/343 |
| 9,383,799 | B2* | 7/2016 | Itou | H04L 12/40039 |
| 9,461,937 | B2* | 10/2016 | Hartwich | G06F 13/4221 |
| 9,606,948 | B2* | 3/2017 | Monroe | G06F 13/372 |
| 10,020,958 | B2* | 7/2018 | Lieder | H04L 12/40032 |
| 10,084,617 | B2* | 9/2018 | Hehemann | H04L 12/4013 |
| 2013/0294460 | A1 | 11/2013 | Hell | |
| 2014/0330996 | A1* | 11/2014 | de Haas | G06F 13/4031 |
| | | | | 710/106 |
| 2015/0222455 | A1* | 8/2015 | Ohtsuka | H04L 25/0272 |
| | | | | 375/219 |
| 2017/0248673 | A1* | 8/2017 | Kang | A61B 5/055 |

\* cited by examiner

COMMUNICATIONS DEVICE FOR TRANSMITTING A DIFFERENTIAL SIGNAL

CROSS REFERENCE TO RELATED APPLICATION

The present application is based on Japanese patent application No. 2016-154783 filed on Aug. 5, 2016, the whole contents of which are incorporated herein by reference.

FIELD

The present invention relates to a communications device for communications of a differential signal.

BACKGROUND

In recent years, CAN-FD protocol, which has been developed based on CAN (trademark) protocol, is used widely. CAN-FD is a controller area network with flexible data rate. In CAN-FD protocol, a frame, which is transmitted and received, is provided with an arbitration area used for bus arbitration and a non-arbitration area for data storage. In the non-arbitration area, data transmission is made faster than in the arbitration area.

For suppressing waveform distortion in the non-arbitration area, in which high speed communications is performed, US 2014/0330996 (patent document) proposes to operate a driver so that a differential voltage having a polarity opposite to that of a dominant, is developed in a communications network at time of outputting a recessive. Since an error frame in the non-arbitration area cannot be detected in this case, it is proposed to detect the error frame based on a voltage level of the communications network.

However, in the conventional CAN, an output impedance of a transceiver is not normalized, that is, not regulated. In the conventional system proposed in the patent document, therefore, different potentials are generated at collision in correspondence to characteristics of transceivers connected to the communications network. It is thus impossible to detect the error frame stably.

SUMMARY

It is therefore an object to provide a communications device, which is capable of detecting an error frame stably.

According to one aspect, a communications device connectable to a communications network having a pair of signal lines for transmitting a differential signal comprises a first transmitting part, a second transmitting part, current monitoring parts and a checking part. The first transmitting part is configured to transmit the differential signal corresponding to a transmit signal expressed in two values to the communications network by switching over a state of the communications network between a driven state for supplying power to the communications network and a non-driven state for shutting down power supply to the communications network in correspondence to the transmit signal. Periods of the driven state and the non-driven state of the first transmitting part are assumed to be a dominant period and a recessive period, respectively. The second transmitting part is configured to be in a non-driven state in the dominant period and a driven state in the recessive period and supply power to the communications network such that a polarity of the differential signal in the recessive period is opposite to that of the differential signal in the dominant period. The current monitoring parts are configured to monitor magnitudes of power supply currents supplied from the second transmitting part to each of the pair of signal lines. The checking part checks whether a signal collision is present in the communications network based on monitor results of the current monitoring parts.

According to the communications device configured as described above, the power supply current of the second transmitting part is detected whatever characteristics other communications devices connected to the communications network have. The detected power supply current is compared with a power supply current which is supplied normally to detect abnormality of the detected power supply current such as excessive current. Since the excessive current occurs when a signal collision, that is, an error frame, is present in the communication network, it is possible to detect the error frame stably.

EMBODIMENT

Figure 1:
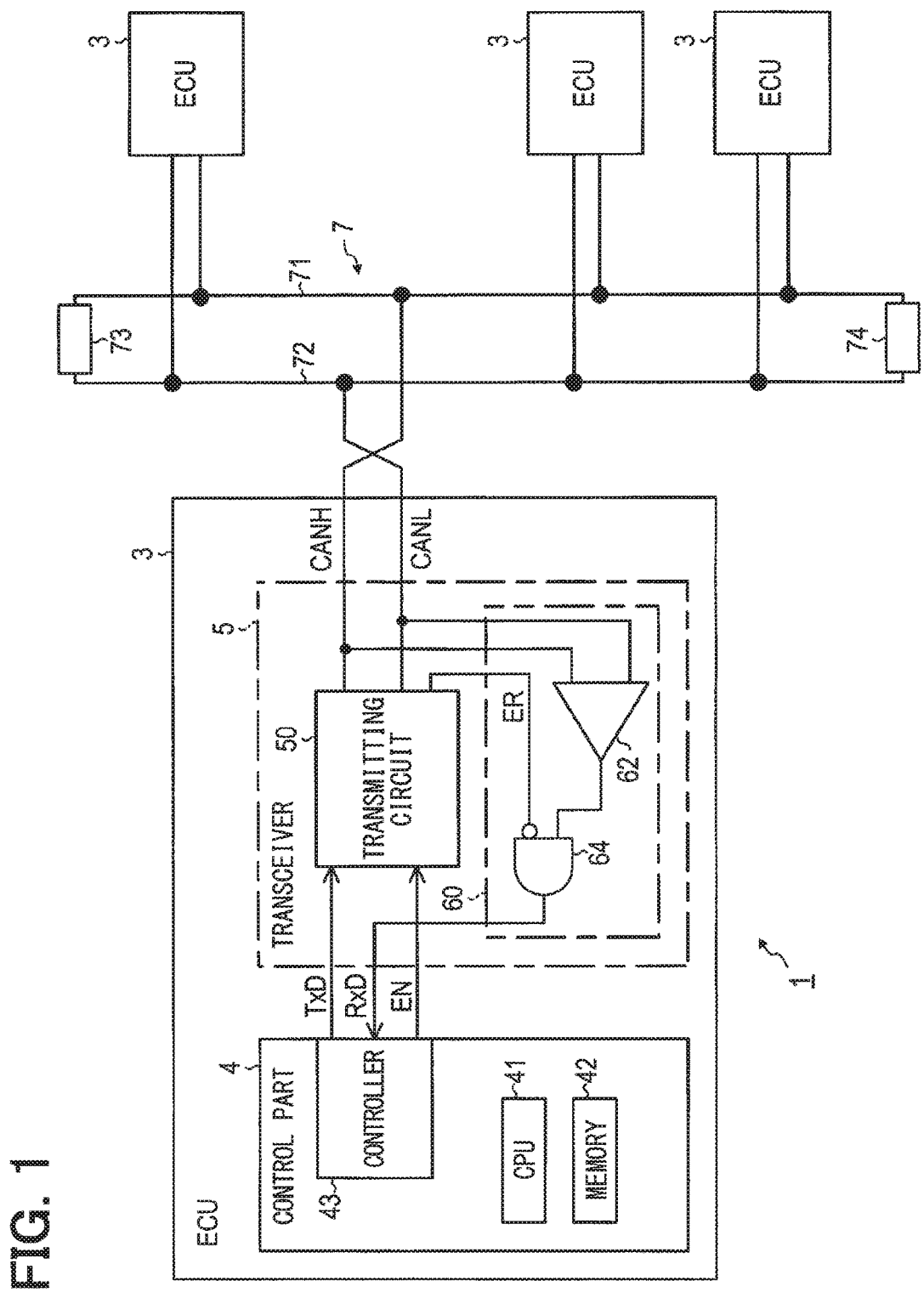
FIG. 1 is a block diagram showing a configuration of a communications system according to a first embodiment.

A communications device will be described below with reference to embodiments shown in the drawings.

[1. First Embodiment]

[1-1. Configuration]

Referring to FIG. 1, a communications system 1 is formed of plural electronic control units (ECUs) 3, which are mounted in a vehicle, and a communications network 7 connecting the plural ECUs 3 mutually.

Each ECU 3 executes communications through the communications network 7 according to CAN-FD protocol to provide or acquire various information and executes various processing based on acquired information for performing assigned functions.

A communications frame used in CAN-FD protocol (CAN-FD frame) has an arbitration area and a non-arbitration area. A bit rate of the arbitration area is set to the same bit rate (for example, 500 Kbps) as that of the conventional CAN. A bit rate of the non-arbitration area is selectable up to a maximum of 5 Mbps, which is higher than that of the arbitration area. In the arbitration area, arbitration is performed when transmit signals from the plural ECUs 3 collide in the communications network 7. In the non-arbitration area, data of the ECU 3, which prevailed in the arbitration, is transmitted. In the following description, the arbitration area and the non-arbitration area are referred to as a low speed area and a high speed area, respectively.

[1-2. Communications Network]

The communications network 7 is a bus-like network formed of a pair of signal lines 71 and 72, which are provided to transmit a differential signal from each ECU 3. The communications network 7 has terminal circuits 73 and 74 at its both ends to suppress reflection of signals. In the following description, one and the other of the pair of signal lines 71 and 72 are referred to as the lines CANH and CANL, respectively.

[1-3. ECU]

Each ECU 3 includes a control part 4 and a transceiver 5, which is provided as a communications device. The control part 4 is formed primarily of a conventional microcomputer, which includes a central processing unit (CPU) 41 and a semiconductor memory 42 such as a RAM, a ROM and a flash memory. The control part 4 includes a communications controller 43, which executes communications according to CAN-FD protocol.

The communications controller 43 supplies transmit data TxD, which indicates CAN-FD frame, and an enabling signal EN, which is set to be a low level in the low speed area and a high level in the high speed area in synchronized relation with the transmit data TxD, to the transceiver 5. The communications controller 43 receives receive data RxD from the transceiver 5 and, when the receive data RxD is a normal CAN-FD frame corresponding to CAN-FD protocol, extracts data of the data area. The high signal levels of the transmit data TxD and the receive data RxD are referred to as recessive. The low signal levels of the transmit data TxD and the receive data RxD are referred to as dominant.

The communications controller 43 is configured to stop transmitting the transmit data TxD as an occurrence of signal collision, that is, error frame, when the receive data RxD continues to be dominant (low level) for a predetermined upper limit period or more.

The CPU 41 executes at least transmitting processing for supplying data, which are to be supplied to other ECUs 3, to the communications controller 43 and receiving processing for executing various processing by using data received by the communications controller 43.

[1-4. Transceiver]

The transceiver 5 includes a transmitting circuit 50 and a receiving circuit 60.

[1-4-1. Receiving Circuit]

The receiving circuit 60 includes a receiver 62 and a gate circuit 64. The receiver 62 outputs a high level and a low level when the signal level of the differential signal received through the communications network 7 is larger and smaller than a predetermined receiving threshold value Vth, respectively.

The gate circuit 64 supplies the communications controller 43 with the output itself of the receiver 62 as the receive data RxD, when the error signal ER outputted from the transmitting circuit 50 is at the low level. The gate circuit 64 supplies the communications controller 43 with the low level signal (that is, dominant) as the receive data RxD, when the error signal ER is at the high level.

[1-4-2. Transmitting Circuit]

Figure 2:
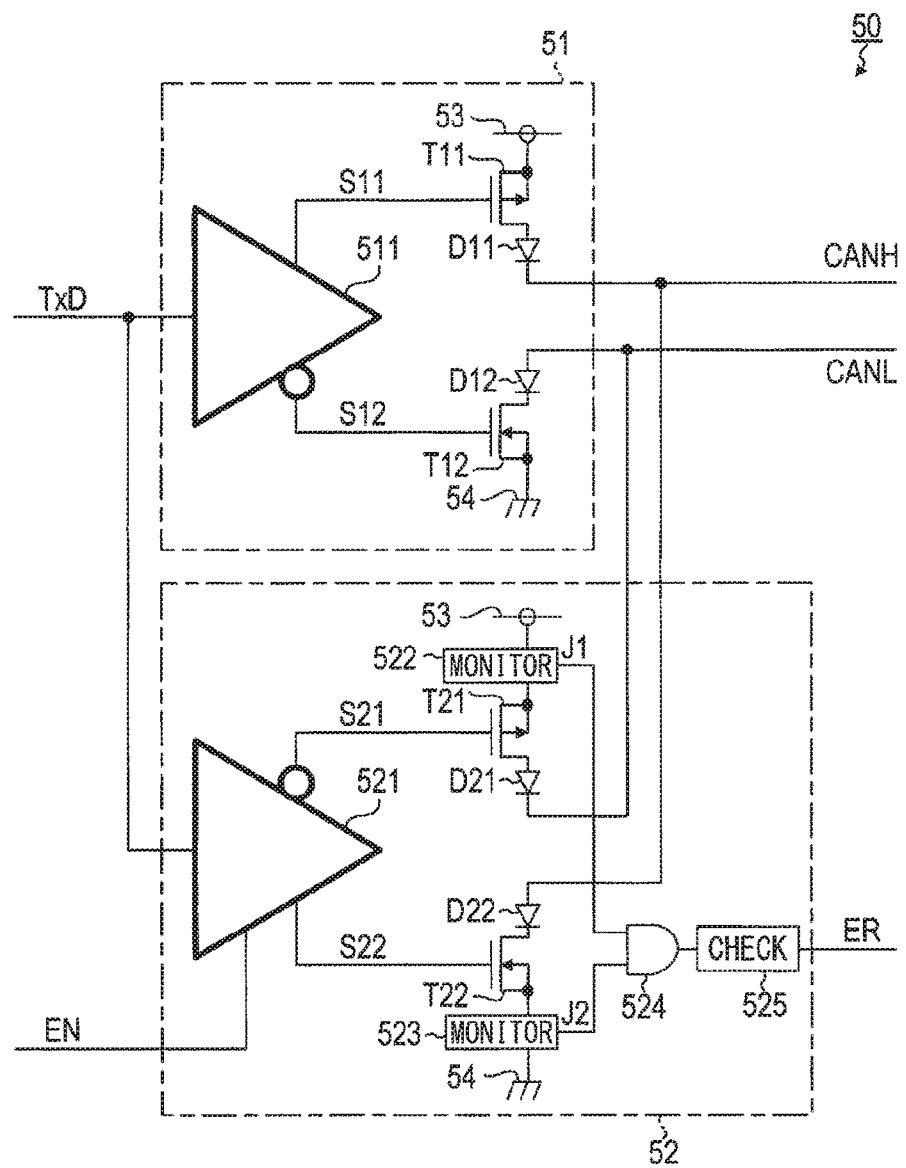
FIG. 2 is a circuit diagram showing a configuration of a transmitting circuit in the first embodiment.

The transmitting circuit 50 includes, as shown in FIG. 2 in detail, a first transmitting part 51 and a second transmitting part 52.

The first transmitting part 51 includes a first driving circuit 511, transistors T11, T12 and diodes D11, D12. The transistor T11 is a P-channel type field effect transistor, a source of which is connected to a power supply line 53 of a DC voltage VDD. The transistor T12 is an N-channel type field effect transistor, a source of which is connected to a ground line 54. An anode and a cathode of the diode D11 are connected to a drain of the transistor T11 and the line CANH, respectively. An anode and a cathode of the diode D12 are connected to the line CANL and a drain of the transistor T12, respectively.

Figure 3A:
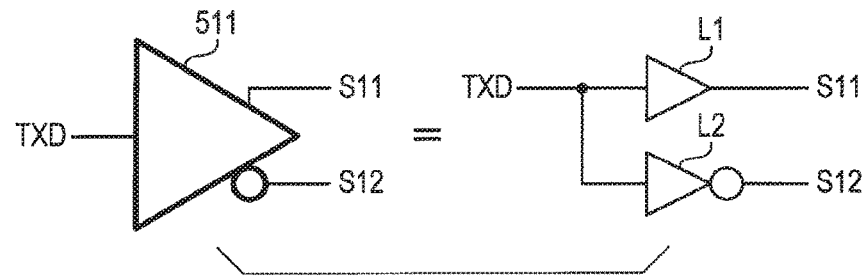
FIG. 3A and FIG. 3B are explanatory diagrams showing equivalent circuits of a dominant driving part and a recessive driving part in the first embodiment, respectively.

The first driving circuit 511 generates a non-inverted output signal S11, which is the same signal level as the transmit data TxD, and an inverted output signal 512, which is the inverted signal level of the transmit data TxD, in response to the transmit data TxD. The first driving circuit 511 may be configured, as shown in FIG. 3A, with a buffer circuit L1 and an inverting circuit L2, for example. The non-inverted output signal 511 is applied to a gate of the transistor T11 and the inverted output signal 512 is applied to a gate of the transistor T12.

That is, when the transmit data TxD is at the high level, the transistors T11 and T12 both turn off, that is, remain in high impedance states. As a result, power is not supplied from the first transmitting part 51 to the communications network 7. When the transmit data TxD is at the low level, the transistors T11 and T12 both turn on. As a result, power is supplied from the first transmitting part 51 to the communications network 7.

The second transmitting part 52 includes a second driving circuit 521, transistors T21, T22, diodes D21, D22. The second transmitting part 52 further includes current monitoring circuits 522, 523, a gate circuit 524 and a filter 525, all or some of which may be provided outside the second transmitting part 52. The transistor T21 is a P-channel type field effect transistor, a source of which is connected to the power supply line 53 of the DC voltage VDD through the current monitoring circuit 522. The transistor T22 is an N-channel type field effect transistor, a source of which is connected to the ground line 54 through the current monitoring circuit 523. An anode and a cathode of the diode D21 are connected to a drain of the transistor T21 and the line CANL, respectively. An anode and a cathode of the diode D22 are connected to the line CANH and a drain of the transistor T22, respectively.

Figure 3B:
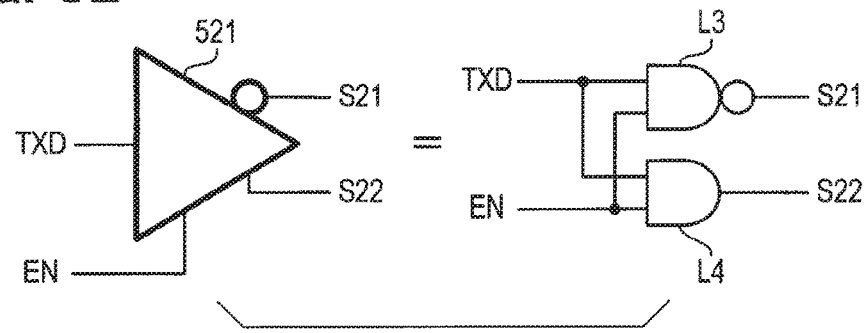

The second driving circuit 521 generates an inverted driving output signal S21 and a non-inverted driving output signal 522 in response to the transmit data TxD and the enabling signal EN. Specifically, when the enabling signal EN is at the high level, the inverted output signal S21 is the same as the level-inverted transmit data TxD and the non-inverted output signal S22 is the same as the signal level of the transmit data TxD. When the enabling signal EN is at the low level, the inverted output signal 521 is at the high level and the non-inverted output signal 522 is at the low level. The second driving circuit 521 may be configured, as shown in FIG. 3B, with a NAND circuit L3 and an AND circuit L4, for example. The non-inverted output signal 521 is applied to a gate of the transistor T21 and the inverted output signal 522 is applied to a gate of the transistor T22.

Figure 4:
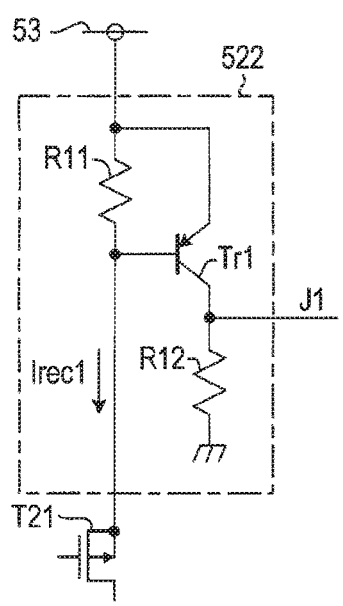
FIG. 4 is a circuit diagram showing a configuration of a current monitoring circuit, which monitors a power supply current to CANL in the first embodiment.

The monitoring circuit 522 includes, as shown in FIG. 4, resistors R11, R12 and a transistor Tr1. The transistor Tr1 is a PNP type bipolar transistor. The resistor R11 is connected between a base and an emitter of the transistor Tr1. The emitter and the base of the transistor Tr1 is connected to the power supply line 53 and a source of the transistor T21, respectively. A collector of the transistor Tr1 is connected to the ground line 54 through the resistor R12 and is an output terminal of a first determination signal J1.

Figure 5:
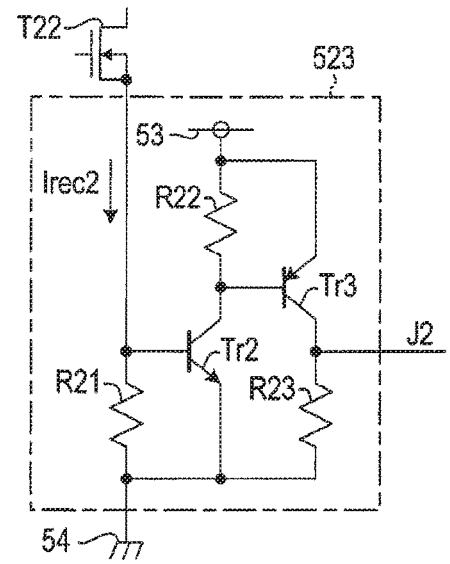
FIG. 5 is a circuit diagram showing a configuration of a current monitoring circuit, which monitors a power supply current to CANH in the first embodiment.

The current monitoring circuit 523 includes, as shown in FIG. 5, resistors R21, R22, R23 and transistors Tr2, Tr3. The transistor Tr2 is an NPN type bipolar transistor. The resistor R21 is connected between a base and an emitter of the transistor Tr2. The emitter and the base of the transistor Tr2 are connected to the ground line 54 and a source of the transistor T22, respectively. The transistor Tr3 is a PNP type bipolar transistor. The transistor Tr3 and the resistors R22, R23 are connected similarly to the transistor Tr1 and the resistors R11, R12 of the current monitoring circuit 522. However, a base of the transistor Tr3 is connected to a collector of the transistor Tr2. A collector of the transistor Tr3 is an output terminal of a second determination signal J2.

It is assumed here that power supply currents flowing to the lines CANL and CANH through the second transmitting part 52 are Irec1 and Irec2, respectively. The power supply currents Irec1 and Irec2, which flow when the transistors T21 and T22 turn on under normal transmission through the communications network 7, are referred to as normal currents, respectively. The power supply currents Irec1 and Irec2, which flow when the transistors T21 and T22 turn on under signal collision in the communications network 7, that is, under occurrence of the error frame, and larger than the normal currents, are referred to as error currents, respectively.

Resistance values of the resistors R11 and R21 are set such that the transistors Tr1 and Tr2 turn on when the error currents flow in the resistors R11 and R21 and that the transistors Tr1 and Tr2 remains in off states when the normal currents flow in the resistors R11 and R21. That is, current threshold values for switching over on and off states of the transistors Tr1 and Tr2 are set to be larger than the normal current and smaller than the error current.

In the current monitoring circuit 522 configured as described above, when the power supply current Irec1 is the normal current, the transistor Tr1 turns off and the first determination signal J1 is at the low level. When the power supply current Irec2 is the error current, the transistor Tr1 turns on and the first determination signal J1 is at the high level.

In the current monitoring circuit 523 configured as described above, when the power supply current Irec2 is the normal current, both of the transistors Tr2 and Tr3 turn off and the second determination signal J2 is at the low level. When the power supply current Irec2 is the error current, both of the transistors Tr2 and Tr3 turn on and the second determination signal J2 is at the high level.

The gate circuit 524 is a conventional AND circuit, which outputs the error signal ER of high level when both of the first determination signal J1 and the second determination signal J2 are at the high levels, that is, the error currents are detected at both of the lines CANH and CANL.

The filter 525 is a low-pass filter, which supplies the communications controller 43 with the error signal ER after filtering out radio frequency signals. That is, the filter 525 is provided to prevent the communications controller 43 from erroneously operating because of noise superimposed in the error signal ER.

[1-5. Operation]

In the following description, a period during which the transmit data TxD is at the high level and the low level are referred to as a recessive period and a dominant period, respectively.

[1-5-1. Operation in Arbitration Area]

An operation of the communications controller 43 in the arbitration area, in which the enabling signal EN of low level is outputted, will be described below. In case that the enabling signal EN is at the low level, both transistors T21 and T22 of the second transmitting part 52 turn off irrespective of the signal level of the transmit data TxD. For this reason, the signal levels at the lines CANH and CANL, and hence the signal level of the differential signal transmitted through the communications network 7, is determined by the first transmitting part 51.

That is, communications according to CAN standards, which is conventional and not described in detail, is performed.

[1-5-2. Operation in Non-Arbitration Area]

An operation of the communications controller 43 in the non-arbitration area, in which the enabling signal EN of high level is outputted, will be described below. In the non-arbitration area, not only the first transmitting part 51 but also the second transmitting part 52 operate in correspondence to the signal level of the transmit data TxD.

Figure 6:
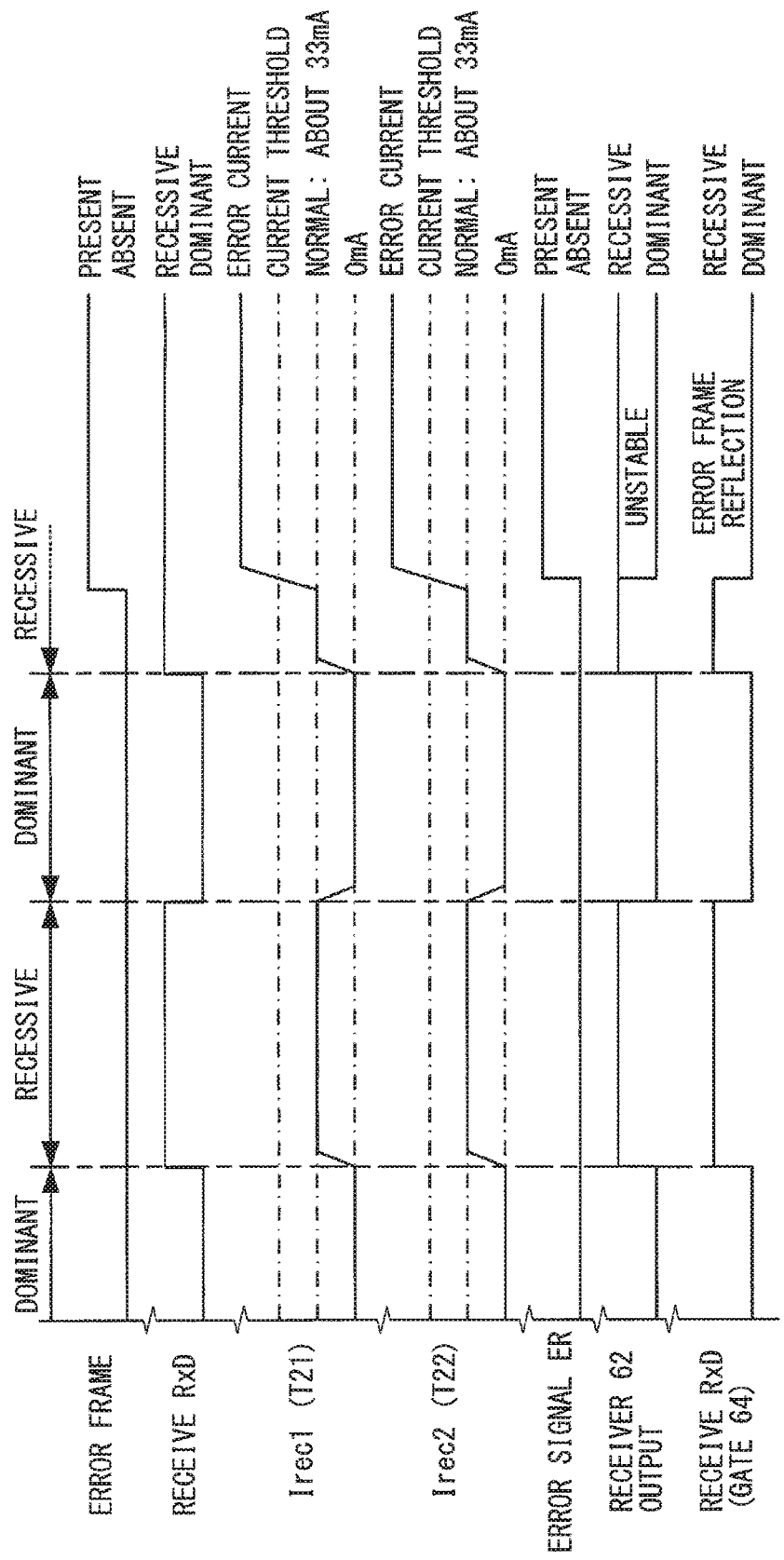
FIG. 6 is a timing chart showing an operation of the transmitting circuit in the first embodiment.

In the normal time, in which no error frame is generated, the following operation is performed. That is, in the recessive period, in which the transmit data TxD is at the high level, both transistors T11 and T12 turn off and both transistors T21 and T22 turn on. For this reason, the potentials at the lines CANH and CANL are determined in correspondence to the power supply from the second transmitting part 52 to the communications network 7. In this situation, as shown in FIG. 6, normal currents flow in the transistors T21 and T22. With the normal currents, both of the first determination signal J1 and the second determination signal J2 are at the low levels and as a result the error signal ER is at the low level. In the dominant period, in which the transmit data TxD is at the low level, both transistors T11 and T12 turn on and both transistors T21 and T22 turn off. For this reason, the potentials at the lines CANH and CANL are determined in correspondence to the power supply from the first transmitting part 51 to the communications network 7. In this situation, although not shown, normal currents flow in the transistors T11 and T12.

In the error time, in which the error frame is generated, the following operation is performed. That is, the transmit data TxD is at the high level, not only the transistors T21 and T22 in the subject ECU 3 but also the transistors T11 and T12 in the other ECU 3, which outputs the low level, turn on. For this reason, the potentials at the lines CANH and CANL are determined in correspondence to the characteristic of the transistor, which is turned on, and not fixedly determined. As a result, the output signal of the receiver 62 forming the receiving circuit 60 is unstable. Since both the lines CANH and CANL are conducted to the power supply line 53 and the ground line 54, excessive error current flows. The error current has an upper limit value determined by the circuit configuration. With the error current, both of the first determination signal J1 and the second determination signal J2 are at the high levels. Further, the error signal ER is also at the high level. As a result, the signal level of the receive data RxD applied to the communications controller 43 is maintained at the low level (that is, dominant).

Upon detection that the signal level of the receive data RxD continues to be at the low level for a predetermined period or more, the communications controller 43 determines that an error is present and, although not shown, stops transmitting the transmit data TxD. It is thus possible to avoid collision of signals in the communications network 7 and eliminate error frame.

When the transmit data TxD is at the low level, the second transmitting part 52 is irrelevant from driving of the lines CANH and CANL. The operation is the same as in the case that the enabling signal EN is at the low level.

[1-6. Advantage]

The communications system 1 described above provides the following advantages.

(1a) In the non-arbitration area, even when the transmit data TxD is at the high level, that is, in the recessive period, the power is supplied to the communications network 7 by the second transmitting part 52. As a result, it is possible to lower an impedance of the communications network 7 in the recessive period and hence suppress ringing, which otherwise occurs at the time of changing from the dominant period to the recessive period.

(1b) In the operation time of the second transmitting part 52, the current monitoring circuits 522 and 523 detect the error currents thereby detecting the error frame. As a result, it is possible to detect stably generation of the error frame even in case that the output impedance of the transceiver 5 is not subject to any regulations and the voltage level of the differential signal on the communications network 7 is unstable at the time of generation of the error frame.

(1c) The communications controller 43 recognizes the error by maintaining the receive data RxD supplied to the communications controller 43 to be dominant, when the error frame is detected. As a result, it is possible to stop outputting of the transmit data Tx© and eliminate the error frame by using the existing anti-error function provided in the communications controller 43.

[1-7. Modification Example]

Figure 7:
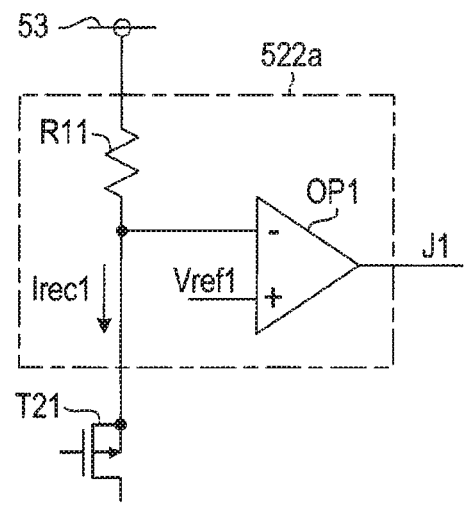
FIG. 7 is a circuit diagram showing the other configuration of a current monitoring circuit, which monitors a power supply current to CANL in a modification example of the first embodiment.

In the first embodiment, the current monitoring circuit 522 is formed of the transistor Tr1 and the resistors R11 and R12. However, it may be configured differently. For example, as shown in FIG. 7, a current monitor circuit 522a may be formed by using an operational amplifier OP1 used as a comparator in place of the transistor Tr1 and the resistor R12. In this configuration, an inverting input of the operational amplifier OP1 is connected to the source of the transistor T21 and a non-inverting input of the operational amplifier OP1 is connected to receive a threshold value Vref1, which corresponds to the current threshold value described above. An output signal of the operational amplifier OP1 is used as the first determination signal J1.

Figure 8:
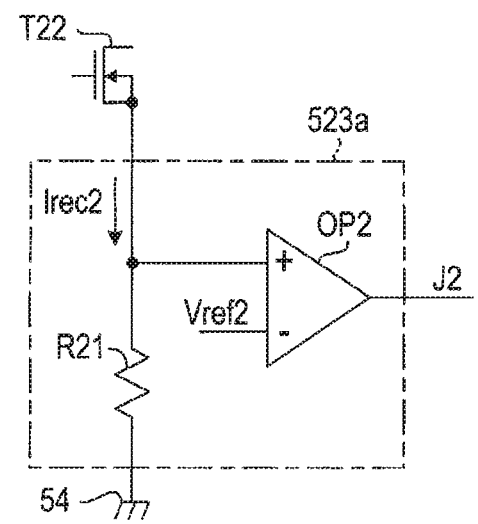
FIG. 8 is a circuit diagram showing the other configuration of a current monitoring circuit, which monitors a power supply current to CANH in the modification example of the first embodiment.

Further, in the first embodiment, the current monitoring circuit 523 is formed of the transistors Tr2, Tr3 and the resistors R21 to R23. However, it may also be configured differently. For example, as shown in FIG. 8, a current monitor circuit 523a may be formed by using an operational amplifier OP2 used as a comparator in place of the transistors Tr2, Tr3 and the resistors R22, R23. In this configuration, a non-inverting input of the operational amplifier OP2 is connected to the source of the transistor T22 and an inverting input of the operational amplifier OP2 is connected to receive a threshold value Vref2, which corresponds to the current threshold value described above. An output signal of the operational amplifier OP2 is used as the first determination signal J2.

[2. Second Embodiment]

[2-1. Difference from First Embodiment]

A second embodiment is similar to the first embodiment in basic configuration and will be described below with reference to differences. In the following description, same structural parts as in the first embodiment are designated with the same reference numerals.

Figure 9:
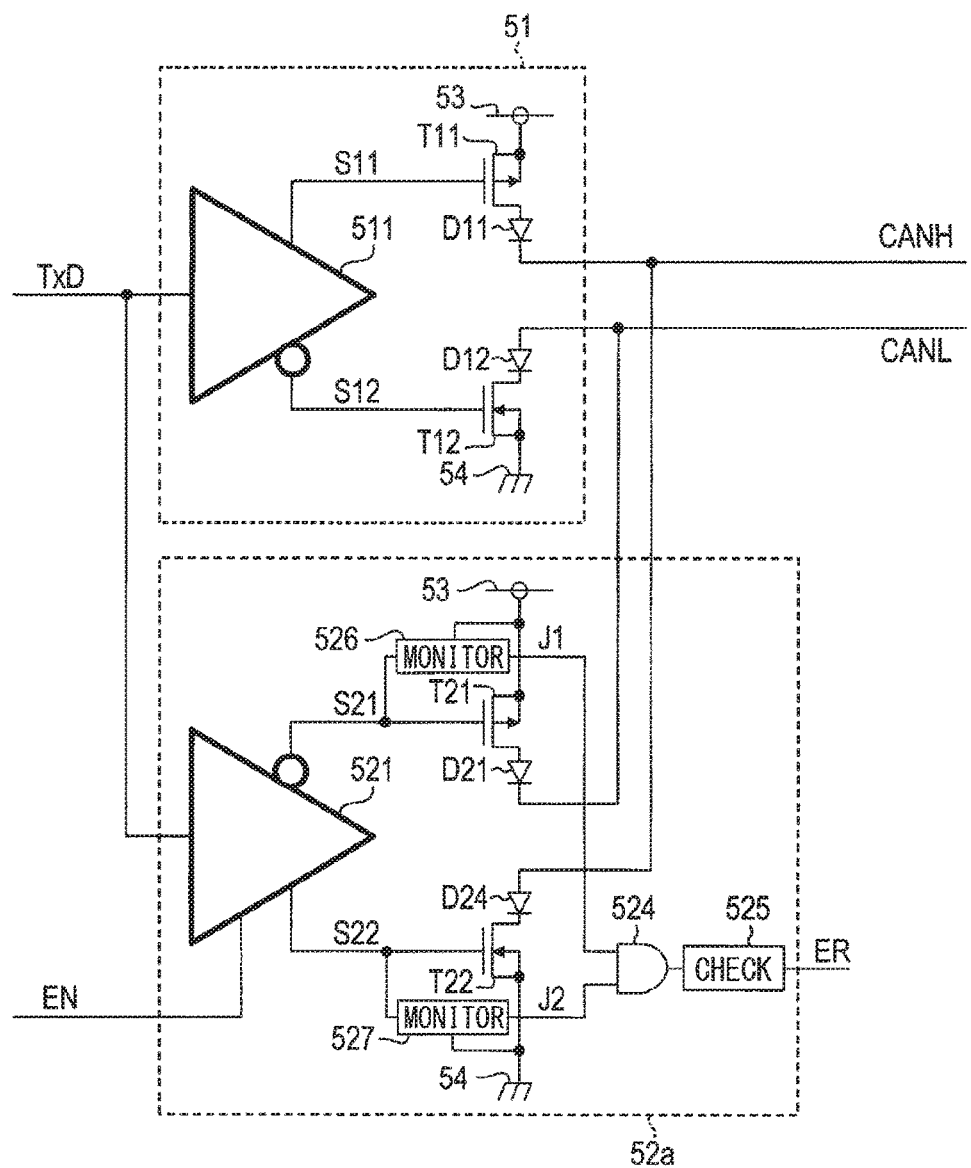
FIG. 9 is a circuit diagram showing a configuration of a transmitting circuit according to a second embodiment.

In the first embodiment described above, the current monitoring circuit 522 of the second transmitting part 52 is provided between the source of the transistor T21 and the power supply line 53, and the current monitoring circuit 523 of the second transmitting part 52 is provided between the source of the transistor T22 and the ground line 54. The second embodiment is different from the first embodiment in that, as shown in FIG. 9, a current monitoring circuit 526 of a second transmitting part 52a is provided between a gate of the transistor T21 and the power supply line 53, and a current monitoring circuit 527 of the second transmitting part 52a is provided between a gate of the transistor T22 and the ground line 54.

[2-2. Current Monitoring Circuit]

Figure 10:
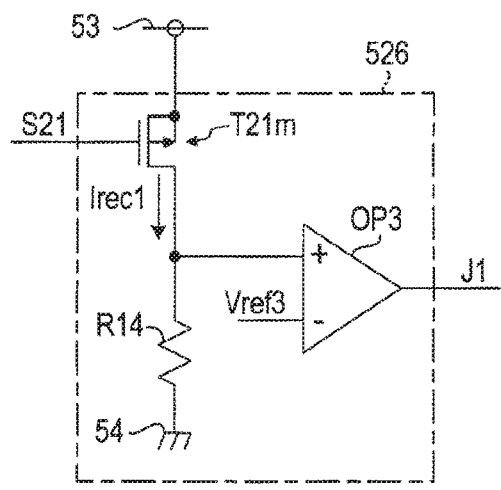
FIG. 10 is a circuit diagram showing a configuration of a current monitoring circuit, which monitors a power supply current to CANL in the second embodiment.

The current monitoring circuit 526 includes, as shown in FIG. 10, a transistor T21$m$, a resistor R14 and an operational amplifier OP3. The transistor T21$m$ is a P-channel type field effect transistor similarly to the transistor 121. A gate, a source and a drain of the transistor T21$m$ are connected to the gate of the transistor T21, the power supply line 53 and the ground line 54 through the resistor R14, respectively. That is, the transistor T21$m$ forms a current mirror circuit jointly with the transistor T21. A non-inverting input of the operational amplifier OP3 is connected to a drain of the transistor T21$m$ and an inverting input of the operational amplifier OP3 is connected to receive a threshold value Vref3, which corresponds to the current threshold value described above. The operational amplifier OP3 is used as a comparator. An output signal of the operational amplifier OP3 is used as the first determination signal J1.

In the current monitoring circuit 526, the transistor T21$m$ is provided so that a reference current, which has the same magnitude as the power supply current Irec1 flowing in the transistor T21, flows in the resistor R14. Based on a voltage drop caused by the resistor R14, the power supply current Irec1 flowing in the transistor T21 is determined.

Figure 11:
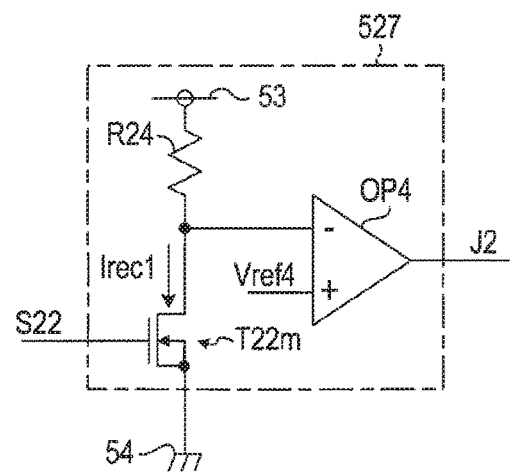
FIG. 11 is a circuit diagram showing a configuration of a current monitoring circuit, which monitors a power supply current to CANH in the second embodiment.

The current monitoring circuit 527 includes, as shown in FIG. 11, a transistor T22$m$, a resistor R24 and an operational amplifier OP4. The transistor T22$m$ is an N-channel type field-effect transistor similarly to the transistor T22. A gate, a source and a drain of the transistor T22$m$ are connected to the gate of the transistor T22, the ground line 54 and the power supply line 53 through the resistor R24, respectively. That is, the transistor T22$m$ forms a current mirror circuit jointly with the transistor T22. An inverting input of the operational amplifier OP4 is connected to the drain of the transistor T22$m$ and a non-inverting input of the operational amplifier OP4 is connected to receive a threshold value Vref4, which corresponds to the current threshold value described above. The operational amplifier OP4 is used as a comparator. An output signal of the operational amplifier OP4 is used as the second determination signal J2.

In the current monitoring circuit 527, the transistor T22$m$ is provided so that a reference current, which has the same magnitude as the power supply current Irec2 flowing in the transistor T22, flows in the resistor R24. Based on a voltage drop caused by the resistor R24, the power supply current Irec2 flowing in the transistor T22 is determined.

[2-3. Advantage]

The second embodiment described above also provides the same advantages (1a) to (1c) of the first embodiment.

[3. Third Embodiment]

[3-1. Difference from First Embodiment]

A third embodiment is similar to the first embodiment in basic configuration and will be described below with reference to differences. In the following description, same structural parts as in the first embodiment are designated with the same reference numerals.

Figure 12:
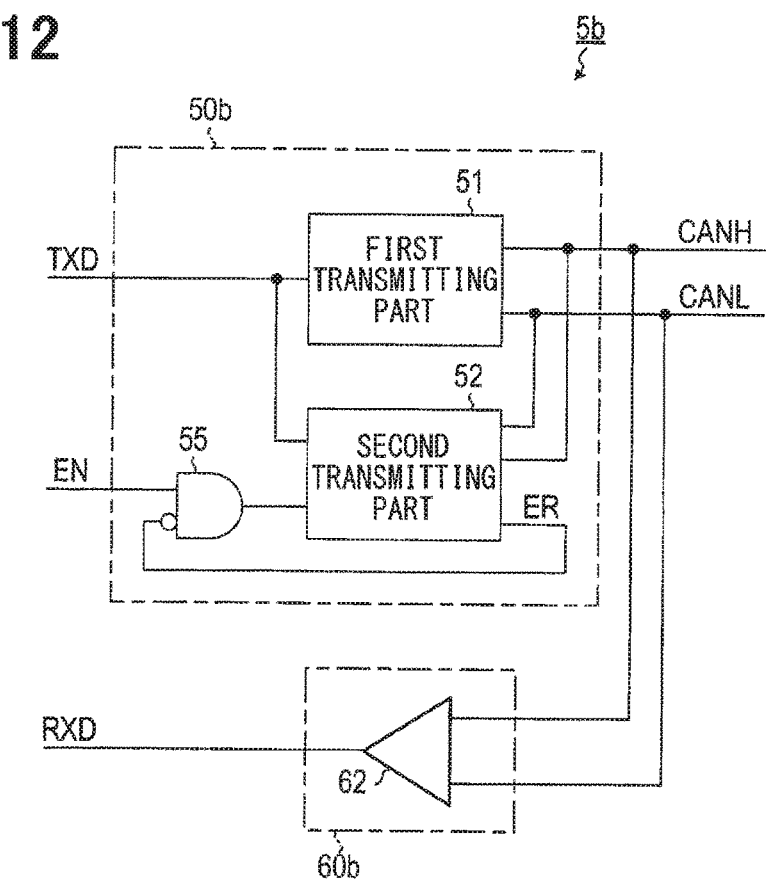
FIG. 12 is a circuit diagram showing a configuration of a transmitting circuit according to a third embodiment.

In the first embodiment, the transceiver 5 is configured to control the signal level of the receive data RxD, which is supplied to the communications controller 43, by the error signal ER. A transceiver 5b in the third embodiment is different from that of the first embodiment in that, as shown in FIG. 12, it is configured to control the signal level of the enabling signal EN, which is supplied from the communications controller 43 to the second transmitting part 52, by the error signal ER.

[3-2. Transceiver]

The transceiver 5b includes a transmitting circuit 50b and a receiving circuit 60b. The receiving circuit 60b includes a receiver 62 and is configured to supply the communications controller 43 with the output of the receiver 62 directly as the receive data RxD. That is, the gate circuit 64 in the first embodiment is removed from the receiving circuit 60.

The transmitting circuit 50b includes a gate circuit 55 in addition to the first transmitting part 51 and the second transmitting part 52. The first transmitting part 51 and the second transmitting part 52 will not be described any more. The gate circuit 55 is configured to output the enabling signal EN, which is supplied from the communications controller 43, directly to the second transmitting part 52, when the error signal ER outputted from the second transmitting part 52 is at the low level. The gate circuit 55 is configured to output the enabling signal EN, which is maintained at the low level, to the second transmitting part 52, when the error signal ER is at the high level

[3-3. Advantage]

The third embodiment described above provides the following advantages in addition to the advantages (1a) and (1b) of the first embodiment.

(3a) When the error frame is detected by in the second transmitting part 52, that is, the error signal ER is changed to the high level, the enabling signal EN supplied to the second transmitting part 52 is forcibly changed to the low level thereby to stop the operation of the second transmitting part 52. It is thus possible to avoid collision of signals produced in the recessive period so that only the signal of error frame transmitted from other nodes remains in the communications network 7. As a result, the communications controller 43 is enabled to recognize the error frame correctly through the receiving circuit 60b and respond properly against the error frame.

[4. Other Embodiment]

The transmitting circuit is not limited to the disclosed embodiments but may be implemented with various modifications as exemplified below.

In the embodiments described above, the AND circuit is used as the gate circuit 524, which generates the error signal ER from the first determination signal J1 and the second determination signal J2. Alternatively, an OR circuit may be used in place of the AND circuit. In case that the AND circuit is used, it is possible to suppress erroneous operations more. In case that the OR circuit is used, it is possible to improve the response characteristic to the error frame more.

The transmitting circuit 50 and 50b described above may be used in any devices, which are different from the transceivers 5, 5b, the ECU 3, the communications system 1 and the like.

What is claimed is:

1. A communications device connectable to a communications network having a pair of signal lines for transmitting a differential signal, the communications device comprising:

a first transmitter configured to transmit the differential signal corresponding to a transmit signal expressed in two values to the communications network by switching over a state of the communications network between a driven state for supplying power to the communications network and a non-driven state for shutting down power supply to the communications network in correspondence to the transmit signal, wherein periods of the driven state and the non-driven state of the first transmitter are assumed to be a dominant period and a recessive period, respectively;

a second transmitter configured to be in a non-driven state in the dominant period and a driven state in the recessive period and supply power to the communications network such that a polarity of the differential signal in the recessive period is opposite to that of the differential signal in the dominant period;

a current monitor configured to monitor a first magnitude of a first power supply current supplied from the second transmitter to a first signal line of the pair of signal lines and a second magnitude of a second power supply current supplied from the second transmitter to a second signal line of the pair of signal lines; and collision checking circuitry for checking whether a signal collision is present in the communications network based on the first and second magnitudes, wherein the collision checking circuitry determines that the signal collision is presented in the communications network when both the first magnitude is larger than a first current threshold and the second magnitude is larger than a second current threshold in the recessive period.

2. The communications device according to claim 1, further comprising:

a receiver configured to check a signal level of the differential signal received through the communications network; and error notifying circuitry configured to maintain an output signal of the receiver at a signal level, which corresponds to the dominant period, when the collision checking circuitry determines that the signal collision is present.

3. The communications device according to claim 1, further comprising:

a stop processor configured to stop a driving operation of the second transmitter when the collision checking circuitry determines that the signal collision is present.

4. The communications device according to claim 1, wherein:

the transmit signal is generated based on CAN-FD protocol; and the second transmitter is configured to operate in a non-arbitration area in the CAN-FD protocol.

5. The communications device according to claim 1, wherein:

the collision checking circuitry is configured to determine that the signal collision is present when the power supply current exceeding a predetermined threshold value is detected in each of the pair of signal lines by the current monitor.

6. The communications device according to claim 1, wherein:
the collision checking circuitry is configured to determine that the signal collision is present when the power supply current exceeding a predetermined threshold value is detected in at least one of the pair of signal lines by the current monitor.

7. The communications device according to claim 1, wherein:
the communications network includes a first signal line and a second signal line;
the transmit signal is expressed by a first signal level and a second signal level;
the first transmitter includes a first switch connected between a first power supply line of a predetermined first potential and the first signal line, a second switch connected between a second power supply line of a predetermined second potential lower than the first potential and the second signal line, and a first driving circuit configured to turn on the first switch and the second switch when the transmit signal is at the first signal level; and
the second transmitter includes a third switch connected between the first power supply line and the second signal line, a fourth switch connected between the second power supply line and the first signal line, and a second driving circuit configured to turn on the third switch and the fourth switch when the transmit signal is at the second signal level.

8. The communications device according to claim 7, wherein:
the current monitor is configured to detect magnitudes of the power supply currents, which flow in the third switch and the fourth switch.

9. The communications device according to claim 7, wherein:
the third switch and the fourth switch are formed of transistors, each of which forms a current mirror circuit; and
the current monitor is configured to detect magnitudes of reference currents, which have same magnitudes as the power supply currents flowing in the current mirror circuits.

10. The communications device according to claim 1, wherein:
the collision checking circuitry determines that the signal collision is not presented in the communications network when both the first magnitude does not exceed the first current threshold and the second magnitude does not exceed the second current threshold in the recessive period.

11. The communications device according to claim 1, wherein:
a period in which a transmit data is in a high signal level is defined as the recessive period; and
a period in which the transmit data is in a low signal level is defined as the dominant period.

* * * * *